US012658758B2

(12) United States Patent (10) Patent No.: US 12,658,758 B2
Abdul et al. (45) **Date of Patent: *Jun. 16, 2026**

(54) BEARING ASSEMBLY FOR AN ELECTRIC MOTOR, AND ELECTRIC MOTOR

(71) Applicant: Aktiebolaget SKF, Gothenburg (SE)

(72) Inventors: Azeez Abdul, Utrecht (NL); Hendrik Anne Mol, Varik (NL); Frank Fiddelaers, Gorinchem (NL)

(73) Assignee: Aktiebolaget SKF, Gothenburg (SE)

( * ) Notice: Subject to any disclaimer, the term of this patent is extended or adjusted under 35 U.S.C. 154(b) by 922 days.

This patent is subject to a terminal disclaimer.

(21) Appl. No.: 17/881,893

(22) Filed: Aug. 5, 2022

(65) Prior Publication Data

US 2023/0039432 A1 Feb. 9, 2023

(30) Foreign Application Priority Data

Aug. 5, 2021 (DE) .......................... 102021208507.5
Dec. 15, 2021 (DE) .......................... 102021214385.7

(51) Int. Cl.
 *H02K 11/40* (2016.01)
 *F16C 19/18* (2006.01)
 (Continued)

(52) U.S. Cl.
 CPC ........... *H02K 5/1732* (2013.01); *F16C 19/18* (2013.01); *F16C 33/583* (2013.01); *F16C 33/6633* (2013.01); *F16C 33/6681* (2013.01); *F16C 33/6688* (2013.01); *H02K 7/083* (2013.01); *H02K 11/40* (2016.01); *F16C 33/6614* (2013.01); *F16C 2380/26* (2013.01)

(58) Field of Classification Search
 CPC ........ H02K 5/16; H02K 5/173; H02K 5/1732; H02K 5/1737; H02K 5/161; H02K 5/22; H02K 5/24; H02K 7/08; H02K 7/083; H02K 11/00; H02K 11/40; H02K 15/14; H05F 3/02; F16C 19/52; F16C 2380/26; F16C 2202/32; F16C 2202/30
 See application file for complete search history.

(56) References Cited

U.S. PATENT DOCUMENTS

| | | | |
|---|---|---|---|
| 5,773,394 A | 6/1998 | Wan et al. | |
| 5,914,547 A * | 6/1999 | Barahia ................. | H02K 11/40 |
| | | | 310/90 |

(Continued)

FOREIGN PATENT DOCUMENTS

| | | | |
|---|---|---|---|
| CN | 201563020 U | 8/2010 | |
| CN | 114024414 A * | 2/2022 | |

(Continued)

*Primary Examiner* — Edgardo San Martin
(74) *Attorney, Agent, or Firm* — J-TEK LAW PLLC; Scott T. Wakeman; Mark A. Ussai

(57) ABSTRACT

At least one main bearing is configured to support a rotational element of the electric motor, and a sacrificial bearing. The main bearing includes at least one inner ring, at least one outer ring and at least one plurality of rolling elements. The sacrificial bearing provides an outer ring, an inner ring, and a plurality of rolling elements disposed between the outer ring and the inner ring. A value of a breakdown voltage for the sacrificial bearing is less than a value of the breakdown voltage for the at least one main bearing.

10 Claims, 3 Drawing Sheets

(51) Int. Cl.
    *F16C 33/58*       (2006.01)
    *F16C 33/66*       (2006.01)
    *H02K 5/173*      (2006.01)
    *H02K 7/08*       (2006.01)

(56) References Cited

U.S. PATENT DOCUMENTS

| | | | |
|---|---|---|---|
| 12,074,482 B2 * | 8/2024 | Durantay | H02K 5/1732 |
| 12,140,187 B2 * | 11/2024 | Abdul | H02K 5/1735 |
| 2013/0038182 A1 * | 2/2013 | Obata | H02K 11/40 |
| | | | 384/126 |
| 2016/0380508 A1 | 12/2016 | Kocevar et al. | |
| 2018/0006493 A1 | 1/2018 | Ludois et al. | |
| 2018/0100114 A1 | 4/2018 | Gao et al. | |
| 2018/0100118 A1 | 4/2018 | Flores-Torres et al. | |
| 2023/0231435 A1 * | 7/2023 | Abdul | F16C 35/06 |
| | | | 310/66 |
| 2024/0120814 A1 * | 4/2024 | Ivan | H02K 1/12 |
| 2024/0429773 A1 * | 12/2024 | Luo | H02K 11/40 |
| 2025/0158461 A1 * | 5/2025 | Luo | H02K 5/173 |

FOREIGN PATENT DOCUMENTS

| | | | | | |
|---|---|---|---|---|---|
| CN | 115208122 A | * | 10/2022 | | |
| CN | 115566838 A | * | 1/2023 | | H02K 11/40 |
| CN | 116073562 A | * | 5/2023 | | |
| CN | 116266724 A | * | 6/2023 | | |
| CN | 116266725 A | * | 6/2023 | | |
| DE | 3741678 A1 | * | 6/1989 | | |
| DE | 102010009114 A1 | * | 8/2011 | | H01R 39/28 |
| DE | 112009001785 T5 | | 1/2012 | | |
| DE | 102016209399 A1 | * | 11/2017 | | |
| JP | 2000316251 A | * | 11/2000 | | |
| JP | 2004162909 A | * | 6/2004 | | F16C 13/02 |
| JP | 2015208082 A | | 11/2015 | | |
| JP | 2022118903 A | * | 8/2022 | | |
| KR | 20220136837 A | * | 10/2022 | | |
| KR | 20230045650 A | * | 4/2023 | | |
| WO | 2017214239 A1 | | 12/2017 | | |
| WO | WO-2023094193 A1 | * | 6/2023 | | H02K 11/40 |
| WO | WO-2024203529 A1 | * | 10/2024 | | |

* cited by examiner

BEARING ASSEMBLY FOR AN ELECTRIC MOTOR, AND ELECTRIC MOTOR

CROSS-REFERENCE TO RELATED APPLICATIONS

This application claims priority to German Patent Application no. 102021214385.7, filed Dec. 15, 2021, and German Patent Application 102021208507.5, filed Aug. 8, 2021, the contents of which are both fully incorporated herein by reference.

TECHNICAL FIELD OF THE INVENTION

The present invention relates to a bearing assembly for an electric motor. The invention also relates to an electric motor.

BACKGROUND OF THE INVENTION

The state of the art is illustrated in the attached FIG. 1. Generally, an electric motor 10 includes a case 12, a rotor having a rotor shaft 14 and rotor windings 15, a stator having stator windings 16, one or more bearings 18, 19 coupling the rotor shaft 14 to the case 12, and various electrical connections (not illustrated). It is common to use variable frequency drives (VFDs) for the electrical motor control. Usually VFDs comprise insulated gate bi-polar transistors (IGBTs) and/or metal-oxide-semiconductor field-effect transistors (MOSFETs), which are being switched in a rather fast manner and comprise steep switching flanks. However, the fast switching of the IGBTs used in VFDs can cause high frequency grounding currents as well as high frequency circulating currents which are generated in the rotor and are driven by common mode voltages through coupling capacitances from stator to rotor and stator-core to stator-iron respectively, which may have a significant influence on a failure of the rotor bearing.

Initially, hydrodynamic films developed inside the bearing contacts resist the flow of electrical current leading to a potential difference across the bearing 18, 19. Hence, a bearing 18, 19 with contacts fully separated by lubricating oil films effectively behaves as an additional capacitor resisting the flow of current to the ground 4. After a certain voltage limit is reached, hydrodynamic films collapse leading to a discharge event 2 inside the bearing 18, 19. The number of discharge events and energy behind each discharge determines the extent to which the bearing is damaged. In that case, the main damage of the bearing is the electrical erosion of rolling surfaces in the bearing: inner raceway, outer raceways, and outer surface of the rolling elements. The bearing is then not suitable to accurately and precisely support in rotation the rotor shaft: vibration, noise, temperature increase and then cracks may lead to the failure of the bearing and then of the electrical motor.

It is therefore object of the present invention to provide a bearing assembly for an electric motor having a rotor supporting bearing with an increased durability against electrical current discharge damages and an increased lifetime.

SUMMARY OF THE INVENTION

This object is solved by bearing assembly for an electric motor according to claim 1. In the following, a bearing assembly for an electric motor, particularly for a vehicle, is provided. The bearing assembly comprises at least one main bearing configured to support a rotational element of the electric motor. The main bearing comprises at least one inner ring providing at least one inner raceway, at least one outer ring providing at least one outer raceway, the inner and outer rings being in relative rotation, and at least one plurality of rolling elements disposed between the inner and outer ring of the main bearing. One of the bearing rings is coupled in rotation with the rotational element of the electric motor.

According to the invention, the bearing assembly for an electric motor is further provided with a so-called sacrificial bearing. The sacrificial bearing comprises an outer ring with an outer raceway, an inner ring with an inner raceway, the inner and outer rings being in relative rotation, and a plurality of rolling elements disposed between the outer ring and the inner ring. One of the sacrificial bearing rings is coupled in rotation with the rotational element of the electric motor, the other ring being grounded. For protecting the main bearing from electrical discharge events, it is proposed that (i) the conductivity of the sacrificial bearing is higher than 20 μS, and (ii) a value of a breakdown voltage for the sacrificial bearing is strictly smaller than a value of the breakdown voltage for the at least one main bearing. In particular, by decreasing the sacrificial bearing's breakdown voltage, a low resistance path is created through the sacrificial bearing for ensuring that the currents such as high frequency grounding currents and/or differential mode circulating currents are grounded through the sacrificial bearing.

Thereby, the main bearing is adapted/designed to be the main support in rotation of the rotational part of the electric motor, and then should be protected from any damage which might occur due to electric current or voltage accumulating in the bearing. On the contrary, the sacrificial bearing, also supporting the rotational part, is allowed to be damaged due to discharge events. The support in rotation of the rotational element is then ensured at any time, whereas the sacrificial bearing, that has no rotation supporting function, permits the current flowing through it.

According to further aspects of the invention which are advantageous but not compulsory, such a bearing assembly for an electric motor may incorporate one or several of the following features:

The main bearing is provided with a lubricant, preferably a grease, configured to lubricate the rolling elements of the respective bearing.

The sacrificial bearing is provided with a lubricant, preferably a grease, configured to lubricate the rolling elements of the respective bearing.

The lubricant of the sacrificial bearing is a conductive lubricant which is electrically conductive. Preferably, the conductive lubricant of the sacrificial bearing is further configured to reduce a buildup of electric potential.

The conductive lubricant for the sacrificial bearing includes an additive that is configured to bind itself on a surface of the at least one inner raceway and/or the at least one outer raceway and/or the rolling elements and to decrease a surface potential and/or a surface isolation. This may also lead to a lower dielectric strength of the sacrificial bearing and thus a decrease of the breakdown voltage for the sacrificial bearing.

The conductive lubricant for the sacrificial bearing may be a fluid, preferably a non-polar, polar base fluids or ionic fluid.

The conductive lubricant may comprise strong acids, preferably near to or fully ionized, or soluble weak acids, or one or more soluble bases, preferable hydroxides of alkali metals.

The fluid may comprise a high ion mobility, and the hydroxides may have a high solubility.

The conductive lubricant for the sacrificial bearing comprises one or more metal salts of one or more different organic acids or carboxylic acids, one or more ammonium salts and/or amide carboxylic acids, wherein preferably the acids are branched or unbranched and/or saturated or unsaturated, and/or the salts have a high solubility.

The conductive lubricant for the sacrificial bearing comprises oxides, particularly semiconductive oxides, and/or metal particles which are low in crystallinity, preferably silver, copper, and/or bismuth, and/or carbon black, and/or metal fluoride compounds.

The conductive lubricant may comprise thermo-chemical stable products having a passivating capability in response to a surface, particularly a bearing steel surface, with preferably high surface sticking characteristics, and/or esters having hydrolyzing effects, and/or ionic liquids, preferably trifluoromethane sulfonate, triflate, and/or methyl triflate, and/or organometallic bismuth compounds and/or organometallic copper compounds.

The conductive lubricant for the sacrificial bearing is oil or a semifluid grease composition or grease or a water-based lubricant.

The conductive lubricant of the sacrificial bearing may comprise at least one additive that is configured to reduce lubricant oil dissociation and/or to prevent lubricant polymerization into a high viscosity matter.

The conductive lubricant comprises a fluid preferably oil or semifluid grease composition comprising one or more metal salts of one or more different organic acids and/or carboxylic acids, wherein the fluid comprises high ion mobility, preferably non-polar, polar base fluids or ionic fluids, wherein the salts have high solubility, and the acids are branched or unbranched, saturated or unsaturated; and/or a fluid preferably oil or semifluid grease composition comprising strong acids preferably near to or fully ionized; and/or soluble weak acids; and/or a fluid preferably oil or semifluid grease composition comprising soluble one or more bases, preferable hydroxides of alkali metals, wherein the fluid comprises high ion mobility, and the hydroxides have high solubility; and/or thermo-chemical stable products, passivating capability in response to (bearing steel) surfaces with preferably high surface sticking characteristics; and/or esters that are prone to hydrolyzing effects; and/or ionic liquids, preferably trifluoromethane sulfonate, triflate, methyl triflate; and/or one or more metal salts of one or more different organic acids and/or carboxylic acids, wherein the acids are branched or unbranched, saturated, or unsaturated; and/or organometallic bismuth compounds and/or organometallic copper compounds; and/or ammonium salts or amide carboxylic acids either derived from one or more different organic acids and/or carboxylic acids or from dianhydride amine compounds; and/or oxides (semi-conductivity); and/or metal particles low in crystallinity, preferably silver, copper, bismuth; and/or carbon black; and/or metal salts of naphthenic acid; and/or metal fluoride compounds; and/or water based lubricants like amide based compounds, amine based compounds, glycerol, and glycol, non-inverted micelle technologies; and/or metal thickened oils, metal saponified greases, clay thickened greases, glycerol or glycol thickened greases, silicon oxide thickened greases, polytetrafluoroethylene thickened greases, aliphatic, alicyclic, aromatic di-, tetra- and/or polyurea and mixtures thereof and/or pastes.

The conductive lubricant of the sacrificial bearing is designed that a value of a breakdown voltage for the sacrificial bearing is small e g, advantageously below 10V. This has the advantage that the main bearing is protected from damages caused by electric current running through the main bearing, while also providing a path for the electric current through the sacrificial bearing.

The value of the breakdown voltage is related to a value of Hertzian contact pressure, and wherein the value of Hertzian contact pressure of the sacrificial bearing is small, e.g., smaller than 500 MPa. Larger Hertzian contact pressure may lead to a larger capacitance of the respective bearing, while smaller Hertzian contact pressure may lead to a smaller capacitance of the respective bearing. The breakdown voltage in the sacrificial bearing may be decreased by the smaller Hertzian contact pressure, which causes the current to run through the sacrificial bearing such that the main bearing is further protected. In particular, the Hertzian contact pressure may be reduced by increasing a ratio between a radius of the rolling elements and a ring cross radius and/or by providing an open osculation. Preferably, value of Hertzian contact pressure of the sacrificial bearing is smaller than a value of Hertzian contact pressure of the main bearing.

The value of the breakdown voltage of the bearing is related to a surface roughness of a component of a bearing, and wherein the surface roughness of a component of the sacrificial bearing is large, e.g., Ra is larger than 50 nm. Preferably, the surface roughness of a component of the sacrificial bearing is larger than a surface roughness of a component of the main bearing. By increasing the surface roughness in the sacrificial bearing, the breakdown voltage of the sacrificial bearing is decreased such that the electric current can be grounded by the sacrificial bearing.

The sacrificial bearing and/or the main bearing is provided with a cage configured to retain the rolling elements of the respective bearing, wherein the cage also comprises a storage capacity for lubricant and/or at least one lubricant additive. This allows that fresh lubricant and/or lubricant additive can be supplied such that the lifespan of the bearing may be prolonged.

At least one of the rolling elements of the sacrificial bearing is made of copper.

The breakdown voltage is related to a rolling element surface velocity, and the rolling element surface velocity of the sacrificial bearing may be smaller than a rolling element surface velocity of the main bearing. This can be achieved by using a relatively small bearing as the sacrificial bearing, e.g., a bearing having a bore diameter between 6 mm and 12 mm, for example around 8 mm, and an outer diameter between 18 mm and 26 mm, for example around 22 mm.

The main bearing is a hybrid bearing with a set of ceramic rolling elements and/or at least one ceramic bearing ring. Moreover, the sacrificial bearing is a steel bearing with a set of steel rolling elements and steel bearing rings.

The invention also concerns an electric motor. The electric motor comprises a case, a stator having stator windings, a rotor having a rotor shaft and rotor windings, and at least one bearing assembly according to any of the preceding embodiments, wherein the main bearing of the bearing assembly is configured to support the rotor of the electric motor, and the sacrificial bearing is configured to have at least one ring fixed in rotation to the rotor.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In the following, preferred embodiments of the invention are described in relation to the drawings, wherein the drawings are exemplarily only, and are not intended to limit the scope of protection. The scope of protection is defined by the accompanied claims, only.

The figures show:

FIG. 3: a schematic view of the sacrificial bearing of FIG. 2.

DETAILED DESCRIPTION OF THE INVENTION

Figure 1:
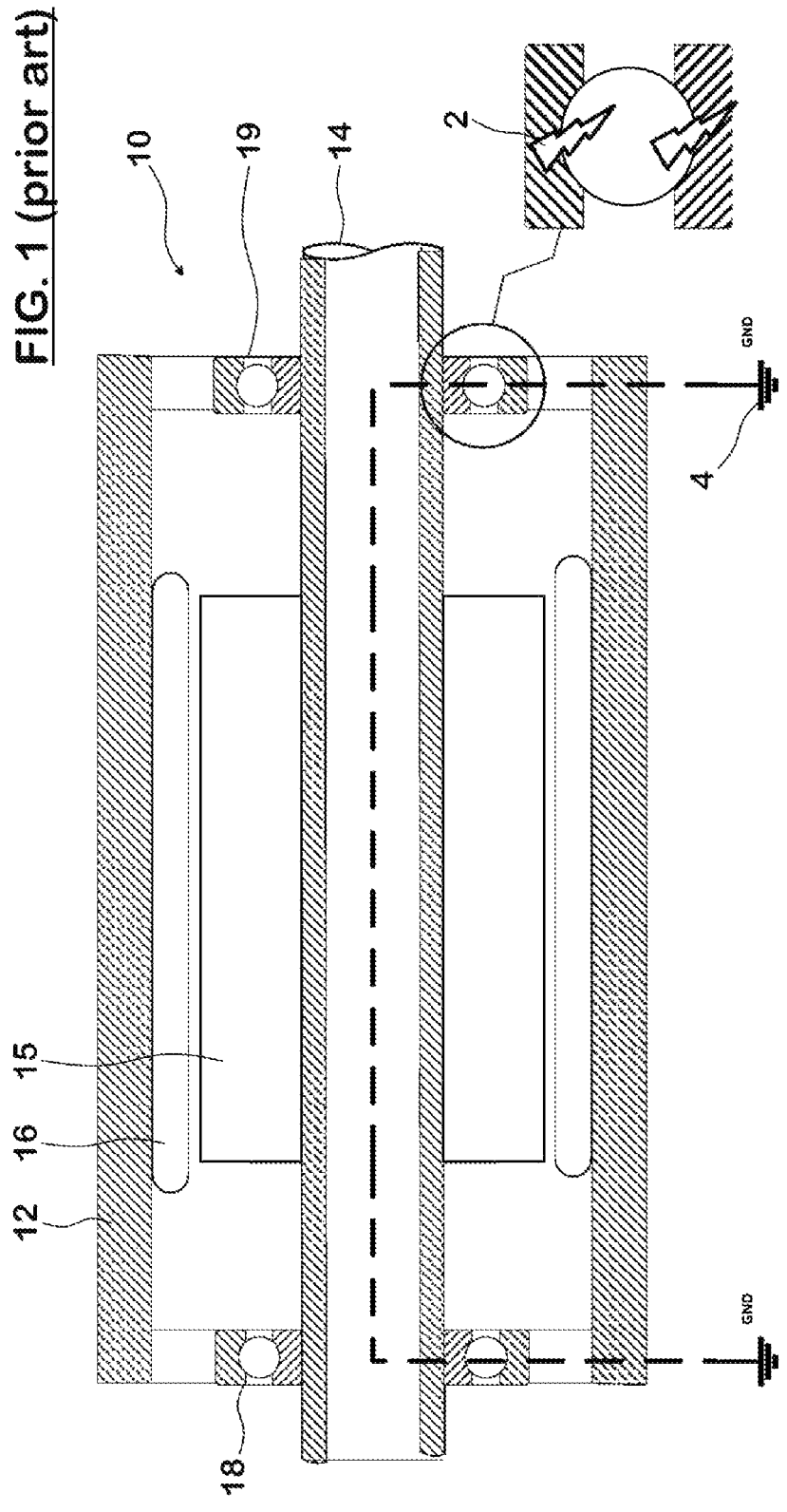
FIG. 1: a schematic view of an electric motor according to the prior art.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following, same or similar functioning elements are indicated with the same reference numerals.

Figure 2:
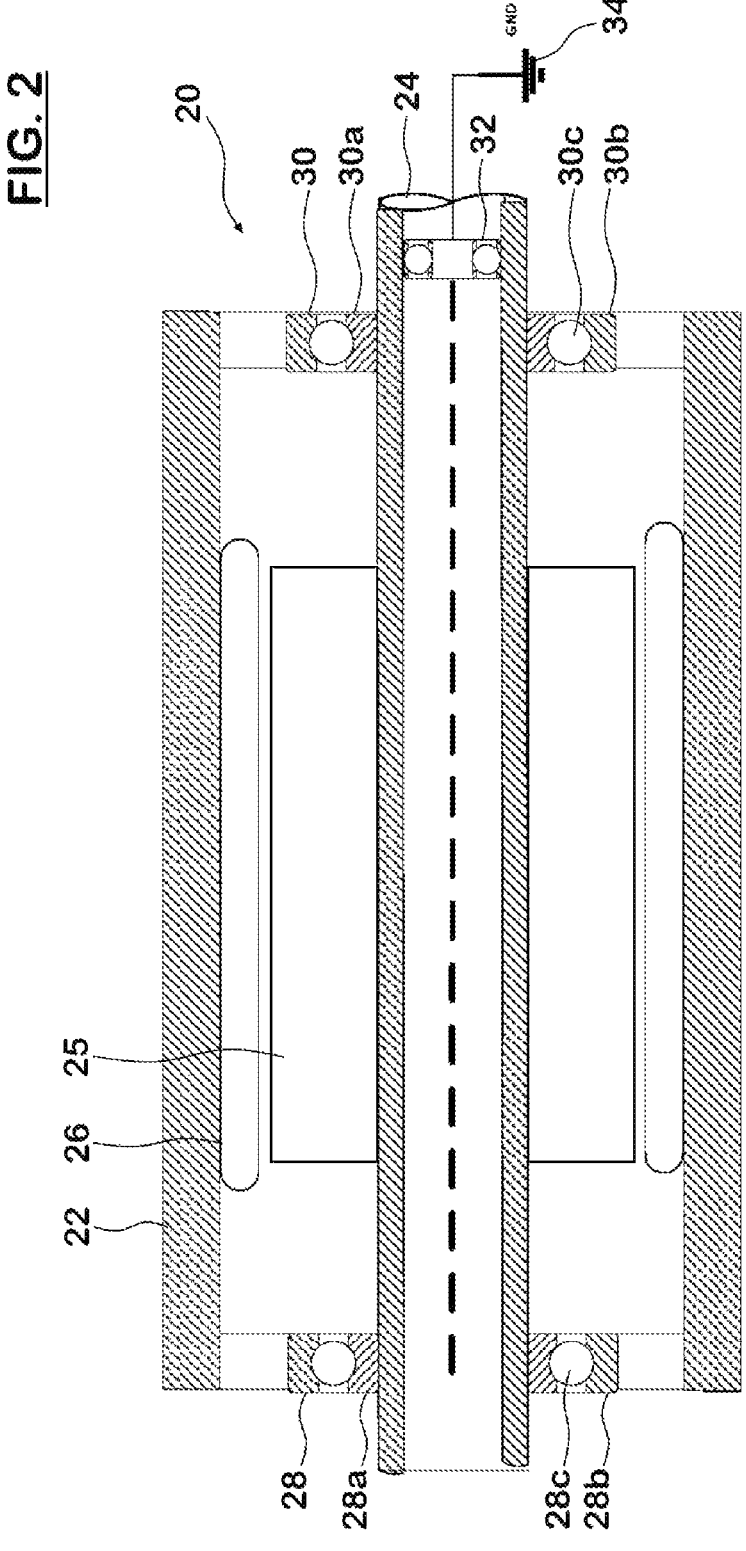
FIG. 2: a schematic view of an electric motor including a sacrificial bearing according to an embodiment of the present invention.

FIG. 2 shows a schematic view of a bearing assembly for an electric motor 20, particularly for a vehicle. The electric motor 20 includes a case 22, a rotor having a rotor shaft 24 and rotor windings 25, a stator having stator windings 26, two main bearings 28, 30 coupling the rotor shaft 24 to the case 22, and various electrical connections (not illustrated).

The two main bearings 28, 30 illustrated in the FIG. 2 are similar. Alternatively, main bearings 28, 30 may be of different type and size. Main bearings 28, 30 comprise each an inner ring 28*a*, 30*a* having at least one inner raceway, an outer ring 28*b*, 30*b* having at least one out raceway, and a set of rolling elements 28*c*, 30*c*, here balls, disposed between the inner and outer rings 28*a*, 28*b* and 30*a*, 30*b*, respectively. Advantageously, both the main bearings 28, 30 are provided with a lubricant, preferably a grease, configured to lubricate the rolling elements of the respective bearing. According to another embodiment, both the main bearings 28, 30 may be provided with a cage configured to retain the rolling elements 28*c*, 30*c* of the respective bearing 28, 30. The cage may also comprise a storage capacity for lubricant and/or at least one lubricant additive. This allows that fresh lubricant and/or lubricant additive can be supplied such that the lifespan of the bearing may be prolonged.

The inner ring 28*a* of main bearing 28 is coupled in rotation with an outer circumferential surface of the rotational shaft 24, and the outer ring 28*b* is fixed in the case 22. The inner ring 30*a* of main bearing 30 is coupled in rotation with an outer circumferential surface of the rotational shaft 24, and the outer ring 30*b* is fixed in the case 22. The main bearings 28, 30 support in rotation the rotational shaft 14 of the electric motor 20 with respect to the case 22. Advantageously, each of the main bearings 28, 30 is mounted on one side of the rotor and stator windings 25, 26.

As illustrated in FIG. 1 as prior art, high frequency grounding currents can be are generated in the rotor shaft 14, 24. These currents can then pass through one of the main bearings and damage its components. More particularly, the surfaces of raceways and/or the balls mays have failures. According to the invention illustrated in FIG. 2, the electric motor 20 is further provided with a sacrificial bearing 32.

Figure 3:
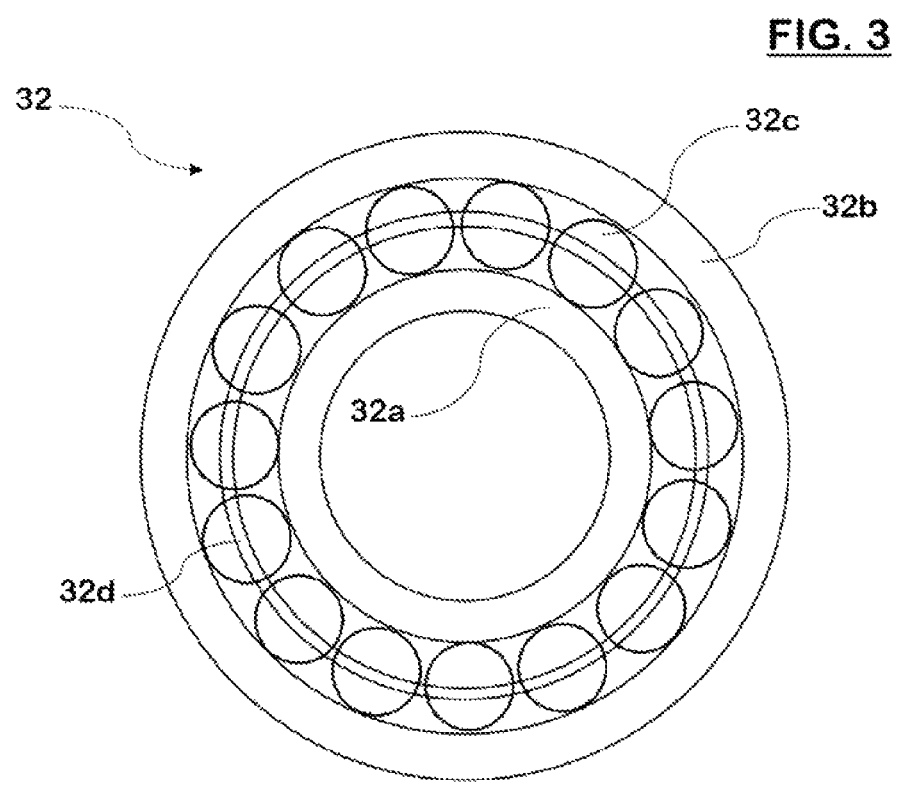

The sacrificial bearing 32 is illustrated in FIG. 3, and comprises an inner ring 32 *a* having an inner raceway, an outer ring 32 *b* having an outer raceway, and a at least one set of rolling elements 32 *c*, here balls, disposed between the inner ring and outer rings 32 *a*, 32 *b*. Advantageously, the sacrificial bearing 32 is provided with a lubricant, preferably a grease, configured to lubricate the rolling elements 32 *c*. According to another embodiment, the sacrificial bearing 32 is provided with a cage 32 *d* configured to retain the rolling elements 32 *c*. The cage may also comprise a storage capacity for lubricant and/or at least one lubricant additive. This allows that fresh lubricant and/or lubricant additive can be supplied such that the lifespan of the bearing may be prolonged.

In the illustrated example, the outer ring 32*b* of the sacrificial bearing 32 is coupled in rotation with the rotor shaft 24, and the inner ring 32*a* is fixed to a grounded feature 34 of the electric motor 20. As an alternate embodiment, the inner ring 32*a* may be coupled in rotation with the rotor shaft 24, and the outer ring 32*b* is fixed to a grounded feature 34.

According to the present invention, and for protecting the main bearings 28, 30 from electrical discharge events, the conductivity of the sacrificial bearing 32 is higher than 20 μS, and the value of a breakdown voltage for the sacrificial bearing 32 is smaller than the value of the breakdown voltage for the main bearings 28, 30. As illustrated in FIG. 2, by decreasing the sacrificial bearing's breakdown voltage, a low resistance path is created through the sacrificial bearing for ensuring that the currents such as high frequency grounding currents and/or differential mode circulating currents are grounded through the sacrificial bearing 32. More precisely, the currents pass from the rotor shaft to the outer ring 32*b*, the rolling elements 32*c* and the inner ring 32*a*, successively, and then to ground 34.

To this end, the main bearings 28, 30 on one hand, and/or the sacrificial bearing 32 on the other hand, are configured to have different breakdown values. More particularly, to a given breakdown value of the main bearings 28, 30, the sacrificial bearing 32 is configured to have a smaller break-down value than that of the main bearings. On the contrary, for a given breakdown value of the sacrificial bearing 32, the main bearings 28, 30 are configured to have an higher breakdown value than that of the sacrificial bearing. In the following, some examples are given to illustrate technical solutions to adjust the breakdown values of the main bear-ings and/or sacrificial bearing so as to ensure the current passage through the sacrificial bearing and the protection of the main bearings from electrical discharge events.

Advantageously, the capacitance and/or a breakdown voltage of the main bearings 28, 30 can be increased. For example, material and/or geometrical characteristic of the main bearings 28, 30 may also be optimized in such a way that the capacitance and/or a breakdown voltage of the main bearings 28, 30 is increased.

To further aid in the protection of the main bearings 28, 30, the breakdown voltage of the sacrificial bearing 32 is decreased such that the sacrificial bearing 32 provides a low resistance path for ensuring that the currents such as high frequency grounding currents and/or differential mode cir-culating currents are grounded through the sacrificial bear-ing. This can be achieved by using an electrically conductive lubricant in the sacrificial bearing 32.

For this purpose, the conductive lubricant of the sacrificial bearing 32 may be advantageously configured to reduce a buildup of electric potential. Additionally, material and/or geometrical characteristic of the sacrificial bearing 32 may also be optimized in such a way that a breakdown voltage of the sacrificial bearing 32 is decreased.

For example, the conductive lubricant may include an additive that is configured to bind itself on a surface of the at least one inner raceway and/or the at least one outer raceway and/or the rolling elements of the sacrificial bearing 32 and to decrease a surface potential and/or a surface isolation. This may also lead to a lower dielectric strength of the sacrificial bearing 32 and thus a decrease of the break-down voltage for the sacrificial bearing 32.

Furthermore, the conductive lubricant may be a fluid, preferably a non-polar, polar base fluids or ionic fluid. Moreover, the conductive lubricant may comprise strong acids, preferably near to or fully ionized, or soluble weak acids, or one or more soluble bases, preferable hydroxides of alkali metals. Also, the fluid may comprise a high ion mobility, and the hydroxides may have a high solubility.

As illustrated in FIG. 2, the sacrificial bearing 6 is advantageously relatively small or at least smaller than the main bearings 28, 30 to reduce a rolling element surface velocity. For example, the sacrificial bearing 32 may have a bore diameter between 6 mm and 12 mm, for example around 8 mm and an outer diameter between 18 mm and 26 mm, for example around 22 mm. The rolling element surface velocity is related to the breakdown voltage. Thus, by reducing the rolling element surface velocity the breakdown voltage can also be decreased.

To further decrease the breakdown voltage ration of the sacrificial bearing 32, the bearing 32 has preferably a large ratio between the radius of the rolling elements 32c and a ring cross radius which reduces a Hertzian contact pressure. This decreases a capacitance of the sacrificial bearing 32 and therefore also a breakdown voltage of the sacrificial bearing 32. Vice versa, it could be advantageous to configure the main bearings 28, 30 for a larger Hertzian contact pressure, which increases the value of the breakdown voltage of the main bearings 28, 30 and therefore the lifetime of the main bearings 28, 30. Finally, the value of Hertzian contact pressure of the sacrificial bearing 32 is smaller than a value of Hertzian contact pressure of the main bearings 28, 304.

According to another embodiment of the invention, at least one of the components of the sacrificial bearing 32, such as the inner ring 32a, the outer ring 32b and/or the rolling elements 32c, has preferably a rather large surface roughness as this also decreases a breakdown voltage. For example, the surface roughness of the at least one of the components of the sacrificial bearings 32 is larger than 50 nm. In contrast, the surface roughness of a component of the main bearing 28, 30 may be preferably low. The raceways of the main bearing 28, 30 may advantageously, comprises a coating that increases the breakdown voltage.

For example, the main bearing may be a hybrid bearing with a set of ceramic rolling elements and/or at least one ceramic bearing ring. Moreover, the sacrificial bearing may be a steel bearing with a set of steel rolling elements and steel bearing rings. The rolling elements of the main bear-ings and of the sacrificial bearing may be any kind of rolling element such as balls, rollers, tapered rollers, needle rollers, etc.

In summary, a lifespan of a main bearing supporting a rotor of an electric motor can be increased by inherently increasing the main bearing capacitance and breakdown voltage, and by providing a high resistance path for the flow of currents such as common mode grounding currents and/or differential mode circulating currents while simultaneously creating a low resistance path through a sacrificial bearing for ensuring that the currents such as high frequency ground-ing currents and/or differential mode circulating currents are grounded. This is achieved by providing the sacrificial bearing with an electrically conductive lubricant.

The invention claimed is:

1. A bearing assembly for an electric motor for a vehicle, the electric motor having a rotor shaft, the rotor shaft having a radially innermost surface, the bearing assembly compris-ing:

at least one main bearing configured to support the rotor shaft of the electric motor, the main bearing comprising at least one inner ring providing at least one inner raceway, at least one outer ring providing at least one outer raceway, the inner and outer rings being in relative rotation, and at least one plurality of rolling elements disposed between the inner and outer rings, one of the bearing rings being coupled in rotation with the rotor shaft of the electric motor, a sacrificial bearing comprising an inner ring with an inner raceway, an outer ring with an outer raceway and a radially outermost surface, the inner and outer rings being in relative rotation, and a plurality of rolling elements disposed between the inner and outer rings, one of the sacrificial bearing rings being coupled in rotation with the rotor shaft of the electric motor, the other ring being grounded, and configured so that (i) the conductivity of the sacrificial bearing is higher than 20 μS, and (ii) a value of a breakdown voltage for the sacrificial bearing is less than a value of the breakdown voltage for the at least one main bearing, the radially outermost surface of the outer ring is configured to be positioned radially within the radially innermost sur-face of the rotor shaft.

2. The bearing assembly according to the claim 1, wherein the surface roughness of at least one component of the sacrificial bearing is greater than any of the surface rough-ness of the components of the at least one main bearing.

9

3. The bearing assembly according to the claim 1, wherein the surface roughness of at least one component of the sacrificial bearing (32) is greater than 50 nm.

4. The bearing assembly according to claim 1, wherein the sacrificial bearing is provided with a lubricant configured to lubricate the rolling elements of the sacrificial bearing, wherein the lubricant is electrically conductive.

5. The bearing assembly according to the claim 4, wherein the lubricant of the sacrificial bearing comprises at least one additive that is configured to reduce lubricant oil dissociation and/or to prevent lubricant polymerization into a high viscosity matter.

6. The bearing assembly according to claim 1, wherein the sacrificial bearing is provided with a cage configured to retain the rolling elements of the sacrificial bearing, wherein the cage also comprises a storage capacity for lubricant and/or at least one lubricant additive.

7. The bearing assembly according to claim 1, wherein the sacrificial bearing is of reduced size with respect to the at least one main bearing.

8. The bearing assembly according to claim 1, wherein the value of Hertzian contact pressure of the sacrificial bearing is smaller than a value of Hertzian contact pressure of the at least one main bearing.

9. The bearing assembly according to claim 1, wherein the at least one main bearing is a hybrid bearing with a set of ceramic rolling elements and/or at least one ceramic bearing ring, and/or the sacrificial bearing is a steel bearing with a set of steel rolling elements and steel bearing rings.

10. An electric motor comprising:

a case, a stator having stator windings, a rotor having a rotor shaft and rotor windings,, the rotor shaft having a radially innermost surface defining a hollow therein, and at least one bearing assembly having for an electric motor for a vehicle, comprising:

at least one main bearing configured to support a rotational element of the electric motor, the main bearing comprising at least one inner ring providing at least one inner raceway, at least one outer ring providing at least one outer raceway and a radially outermost surface, the inner and outer rings being in relative rotation, and at least one plurality of rolling elements disposed between the inner and outer rings, one of the bearing rings being coupled in rotation with the rotational element of the electric motor, a sacrificial bearing comprising an inner ring with an inner raceway, an outer ring with an outer raceway, the inner and outer rings being in relative rotation, and a plurality of rolling elements disposed between the inner and outer rings, one of the sacrificial bearing rings being coupled in rotation with the rotational element of the electric motor, the other ring being grounded, and configured so that (i) the conductivity of the sacrificial bearing is higher than 20 μS, and (ii) a value of a breakdown voltage for the sacrificial bearing is less than a value of the breakdown voltage for the at least one main bearing, the radially outermost surface of the outer ring is positioned within the hollow and is positioned radially within the radially innermost surface of the rotor shaft, wherein at least one main bearing of the bearing assembly is configured to support the rotor shaft of the electric motor, and it further comprises a sacrificial bearing.

* * * * *